(12) United States Patent
Liao et al.

(10) Patent No.: US 11,121,929 B2
(45) Date of Patent: Sep. 14, 2021

(54) METHOD, LOCATION DEVICE AND SYSTEM FOR MANAGING NETWORK DEVICES

(71) Applicant: LEDVANCE GmbH, Garching bei Munchen (DE)

(72) Inventors: Wuqiang Liao, Shenzhen (CN); Dengpan Liu, Shenzhen (CN); Guangli Lei, Shenzhen (CN); Yafen Zhang, Shenzhen (CN)

(73) Assignee: LEDVANCE GMBH, Garching bei Munchen (DE)

( * ) Notice: Subject to any disclaimer, the term of this patent is extended or adjusted under 35 U.S.C. 154(b) by 0 days.

(21) Appl. No.: 16/994,015

(22) Filed: Aug. 14, 2020

(65) Prior Publication Data
US 2021/0051078 A1 Feb. 18, 2021

(30) Foreign Application Priority Data
Aug. 18, 2019 (CN) .......................... 201910761452.4

(51) Int. Cl.
*G06F 15/173* (2006.01)
*H04L 12/24* (2006.01)
*H04W 4/029* (2018.01)
*H04L 29/08* (2006.01)

(52) U.S. Cl.
CPC ............ *H04L 41/12* (2013.01); *H04L 41/145* (2013.01); *H04L 67/18* (2013.01); *H04W 4/029* (2018.02)

(58) Field of Classification Search
CPC ....... H04L 41/12; H04L 41/145; H04L 67/18; H04W 4/029
USPC ......................................................... 709/223
See application file for complete search history.

(56) References Cited

U.S. PATENT DOCUMENTS

| | | | |
|---|---|---|---|
| 2015/0130957 A1* | 5/2015 | Berelejis | H04L 67/12 348/211.1 |
| 2017/0099353 A1* | 4/2017 | Arora | H04L 67/22 |
| 2017/0235585 A1* | 8/2017 | Gupta | H04L 41/12 718/1 |
| 2018/0249298 A1* | 8/2018 | Jain | H04W 4/023 |
| 2019/0044826 A1* | 2/2019 | Flores Guerra | H04L 41/22 |

* cited by examiner

*Primary Examiner* — Atta Khan
(74) *Attorney, Agent, or Firm* — Hayes Soloway PC

(57) ABSTRACT

A method for managing network devices is provided. The method comprises collecting position data of at least one network device with a location device for determining the position of the at least one network device relative to at least one positioning base, collecting device information data from the at least one network device with the location device, the device information data representing individual properties of the at least one network device, determining the position of the at least one network device according to the position data, providing a model of the physical environment based on environment data, and mapping the at least one network device to the model of the physical environment such that the device information data of the at least one network device is assigned to at least one location in the model of the physical environment, according to the position of the at least one network device.

15 Claims, 5 Drawing Sheets

METHOD, LOCATION DEVICE AND SYSTEM FOR MANAGING NETWORK DEVICES

CROSS-REFERENCE TO RELATED APPLICATIONS AND PRIORITY

This patent application claims priority from Chinese Patent Application No. CN 201910761452.4 filed Aug. 18, 2019, which is incorporated by reference herein in its entirety.

TECHNICAL FIELD

The technical field of present disclosure generally relates to network management. In particular, the present discloser relates to a method, a location device and a system for managing network devices.

BACKGROUND

There are methods and systems known, which may be used for managing network devices installed in a physical environment. It is also known that a plurality of network devices may be controlled by computers. For networks with a large number of network devices, it may be difficult, however, to properly arrange, identify, and control the network devices.

SUMMARY

An object of the present disclosure is to provide a user-friendly method for managing network devices. A further object of the present disclosure is to provide a location device and a system enabling the implementation of the method for managing network devices.

According to a first aspect, a method for managing network devices arranged in a physical environment is provided. The method comprises collecting position data of at least one network device with a location device for determining the position of the at least one network device relative to at least one positioning base.

The method further comprises collecting device information data from the at least one network device with the location device, the device information data representing individual properties of the at least one network device. The location information and device information can be reported to the server at the same time, so that server get the location and unique identification number (ID) of the at least one network device. This method enables the mapping of device ID and location.

The method also comprises determining the position of the at least one network device based on the position data.

Further, the method comprises providing a model of the physical environment based on environment data and mapping the at least one network device to the model of the physical environment such that the device information data of the at least one network device is assigned to at least one location in the model of the physical environment, according to the position of the at least on network device.

The method further comprises displaying the model of the physical environment on a user interface (UI), the at least one network device being indicated by at least one icon in the model of the physical environment, for controlling the at least one network device based on the mapping of the at least one network device to the model of the physical environment.

The at least one network device may comprise a plurality of network devices. In particular, it may comprise any kind of networkable devices with at least one adjustable parameter, such as smart devices adapted to communicate with other devices. The network devices may be configured to communicate with other smart devices and/or to be part of an internet of things (IoT).

The device information data, representing individual properties of the network devices may comprise unique identification number (ID), device type, manufacturer ID, etc. Further, the device information data may represent technical characteristics or specification information, relevant for controlling the network devices.

The physical environment may be any environment in which the network devices may be arranged. The physical environment may be, in particular, an indoor or outdoor area, a building, a part of a building, a production hall, an office, or a residential space.

The model of the physical environment may be based on environment data, from which a two-dimensional (2D) or three-dimensional (3D) model of the physical environment can be created. The model may be further a 3D model which is constructed on the basis of a 2D model or floor plan of the physical environment.

The method can be easily implemented by persons without profound technical skills. The mapping of the network devices to the model of the physical environment can facilitate the identification and control of the network devices by providing an overview of the device positions in the physical environment. Further, the mapping of specific devices to specific positions in the environment can be especially helpful when the network comprises a large number of network devices which can be easily confused by the user. The overview of the system provided by the mapping of the network devices to the model of the physical environment can help to avoid errors or wrong operation that happens if a large number of network devices is manually installed. The displaying of the model of the physical environment with the icons of the mapped networked devices on the UI makes the control of the network particularly user friendly and less prone to mistakes.

In some embodiments, the at least one positioning base may comprise a number of positioning bases, in particular three or more bases, positioned at known positions in the physical environment. The method may comprise inputting the coordinates of the positioning bases over the UI for determining the position of the at least one network device.

The collecting of the position data with the location device may be based on ultrawideband (UWB) positioning technology. The UWB technology enables an energy-efficient and accurate determination of device position. With the UWB technology, a highly precise determination of the positions of the network devices is possible. In some embodiments, the spatial resolution or the deviation in the position determination is less than 50 cm. This precision is sufficient for many applications.

For collecting the position data, other technologies, such as Bluetooth 5.0 (registered trademark) and Wi-Fi (registered trademark), may be used. These technologies are well-standardized and readily available for positioning purposes.

The method may comprise adjusting at least one adjustable parameter of the at least one network device based on the model of the physical environment displayed on the UI. The adjustment of the at least one adjustable parameter on the basis of the model of the physical environment displayed on the UI enables a user-friendly adjustment of the adjustable parameters, in accordance with the real physical environment.

The at least one network device may comprise more than one network device of the plurality of network devices, and the adjusting may comprise automatically adjusting the at least one adjustable parameter based on the positions of the more than one network device in the environment. By taking into account the positions of the network devices in the environment, the adjustment matching the physical environment can be performed automatically. In some embodiments, the adjustment is further performed based on the positions of the network devices relative to each other. By taking into account the positions of the network devices relative to each other, a self-consistent adjustment of the plurality of network devices can be performed automatically.

The method may further comprise manually adjusting the at least one adjustable parameter of the at least one network device over the UI. In particular, the manual adjustment can be applied separately or additionally to the automatic adjustment for refining the automatic adjustment based on the visual picture of the model of the physical environment displayed on the UI.

The collecting of the device information data may comprise scanning a QR-code of the at least one network device with a QR-scanner of the location device. The location device can be configured, in particular, as a handheld scanning device or QR-scanner which can be used to scan the QR-codes of the network devices. The scanning of the QR-codes provides an easy and quick way for collecting the device information data from individual network devices.

The method may comprise sending the position data and the device information data from the location device to a computer server. Thus, the position data and the device information from different network devices can be collected and handled centrally by the computer server. The centralized handling of the location data and the device information data is particularly helpful for controlling a large number of network devices, since the computing power of the computer server can be used. In some embodiments, the position data comprises processed data representing the location of the location device relative to the positioned bases. The position data sent from the location device to the computer server may comprise raw data representing distances between the location device and the positioning bases. Thus, the computation of the positions can be taken over by the computer server, and the workload of the location device can be reduced.

In some embodiments, the at least one network device comprises at least one luminaire, wherein the at least one adjustable parameter comprises at least one adjustable light parameter, in particular luminous flux, brightness, luminance, and/or light color temperature. The mapping of the luminaires to the model of the physical environment can provide a clear overview over the locations of the luminaires in the physical environment and thus facilitate the management of the network of the luminaires. The one or more light parameters of the luminaires may be adjusted or equalized in such a way that a desired illumination of the physical environment is achieved.

In some embodiments, the method comprises modelling or simulating the operation of the network devices. In the case of luminaires, the method may comprise modelling an illumination of the physical environment illuminated by the at least one luminaire and displaying a modelled illumination on the UI. The modelled illumination of the physical environment may be displayed together with the model of the physical environment on the UI, giving a realistic model of the illuminated physical environment. Based on the modelled illumination of the physical environment, the at least one light parameter of the luminaire can be adjusted in such a way that a desired illumination of the physical environment is achieved. Thus, a realistic real-time simulation of the operation of the luminaires can be used to visually control and to adjust the luminaires over the UI.

In some embodiments, the device locations in the model of the physical environment may be rearranged, and the physical environment may be modelled with the rearranged locations of the network devices. The rearrangement of the device locations in the model environment can be particularly helpful in finding the optimal positions of the network devices, such that the network devices in the physical environment can be rearranged accordingly.

According to a second aspect, a location device for managing network devices arranged in a physical environment is provided. The location device comprises a processor and a positioning tag configured to collect position data for determining positions of the network devices relative to at least one positioning base provided in the physical environment. The location device further comprises a QR-scanner for collecting device information data representing individual properties of the network devices, a communication interface for communicating, in particular for wirelessly communicating, with a server, and a memory unit configured to store instructions executable by the processor to cause the processor to receive the position data from the positioning tag and the device information data from the QR-scanner and to instruct the communication interface to send the position data and the device information data to the computer server.

The positioning tag may be configured to wirelessly communicate with the at least one positioning base for determining the position of the positioning tag of the location device. By bringing the location device close to one of the network devices and determining the position of the positioning tag, the position of the respective network device can be determined. The location device may be a compact handheld device which can be easily brought to the network devices. In particular, if the location device is positioned in a distance from a network device which is smaller than the spatial resolution of the determination of the tag location, the precision of the determination of the position of the network device can be limited only by the resolution of the wireless technology underlying tag localization determination.

The wireless communication of the positioning tag with the at least one positioning base may be based on UWB (ultrawide band) technology. The UWB technology enables a reliable position determination with a high precision. In particular, measurement deviations can be less than 50 cm, which may be sufficiently small for controlling network devices in many outdoor or indoor applications.

The QR-scanner may be configured to collect the device information data by scanning QR-codes of the network devices. The device information, representing individual properties of the network devices may comprise unique identification number (ID), device type, manufacturer ID, etc. Further, the device information data may provide technical characteristics or specification information, relevant for controlling the network devices. By scanning the QR-codes with the QR-scanner, the device information data can be quickly and easily collected from individual devices.

The instructions executable by the processor may comprise instructions to process the position data received from the positioning tag prior to sending the position data to the computer server. In particular, the processed position data may represent positions calculated from raw position data provided by the positioning tag to the processor of the location device. Thus, the computer server can be provided with already-calculated positions of the network devices. In some embodiments, the instructions executable by the processor may comprise instructions to send the unprocessed position data to the computer server, such that the computation of the network device positions can be performed by the computer server. Thus, the computational power of the processor of the location device can be reduced, resulting in a cheaper and smaller location device.

According to a third aspect, a system for managing network devices arranged in a physical environment is provided. The system comprises a computer server, a location device with a positioning tag for providing position data and a QR-scanner for providing device information data. The location device with the positioning tag and the QR-scanner can be mounted together, so that the device information and the location date can be paired and reported to the computer server essentially at the same time. The computer server comprises a communication interface configured to receive data from the location device and to send control signals to the network devices. The computer server can receive the paired data of location and device information and store the mapping of location and the network device ID. The computer server further comprises a user interface (UI) for controlling the network devices, a processor, and a memory unit configured to store environment data representing the physical environment, the position data, and the device information data. The memory unit is further configured to store information data related to a physical environment, position data, and the device information data related to the network devices. The memory unit is also configured to store instructions executable by the processor to provide a model of the physical environment, in particular, based on the environment data, to map the network device to the model of the physical environment, and to display the model of the physical environment on the UI, the at least one network device being indicated by at least one icon in the model of the physical environment, for controlling the at least one network device based on the mapping of the at least one network device to the model of the physical environment.

The mapping of the network devices to the model of the physical environment can facilitate the control of the network devices by providing an overview over the properties of individual network devices and their positioning in the physical environment. The mapping of specific devices to specific positions in the environment can be especially helpful when the network comprises a large number of network devices which can be easily confused by the user.

The system may further comprise one or more gateways for communication between the computer server and the network devices. In particular, the gateways may be configured to transfer control signals received from the computer server over a wired or wireless communication to individual network devices. In some embodiments, the gateways are configured to wirelessly transfer the control signals to the individual network devices. The gateways may be arranged in or assigned to separate zones or control zones of the environment such that all network devices in one zone are controlled over one gateway. By dividing the environment into control zones with dedicated gateways, the handling of a large number of network devices distributed over larger spaces, can be facilitated.

The UI may comprise an interactive UI configured to control the network devices by selecting respective icons on the UI. The interactive UI may comprise, in particular, a touchscreen display which is configured to visualize data and to receive user commands over a control panel disclosed on the touchscreen display for controlling the network devices. The control panel may comprise, in particular, slide bars for manually controlling the network devices. In some embodiments, the UI is a display of a smart portable device wirelessly connected with the computer server.

The UI may be further configured to display diagnostic parameters, indicating the operational state of the network devices. In particular, the UI may be configured to display a dashboard showing diagnostic parameters and/or status information of the network. The network status information may comprise status information of individual network devices and/or global status information related to the network as a whole. In particular, the status information may comprise health status information of the network. The health status may comprise the ratio of the number of functioning or offline devices to the total number of the network devices. In the case of luminaires, the status information of network devices may comprise "on/off" status, brightness, color temperature, etc. The UI may be configured to display a dashboard showing the energy consumption of the network devices, in particular, one or more network devices of the plurality of network devices, and/or the energy consumption summary, in particular for a room or area, in particular over a selectable time period. The UI may be further configured to display a dashboard showing the remaining lifetime of the network devices. The UI may be configured to display a dashboard showing predictive maintenance data.

In the following description, details are provided to describe the embodiments of the present disclosure. It shall be apparent to one skilled in the art, however, that the embodiments may be practiced without such details.

BRIEF DESCRIPTION OF THE DRAWINGS

Some parts of the embodiments have similar parts. The similar parts may have same names or similar part numbers. The description of one part applies by reference to another similar part, where appropriate, thereby reducing repetition of text without limiting the disclosure.

DETAILED DESCRIPTION

Figure 1:
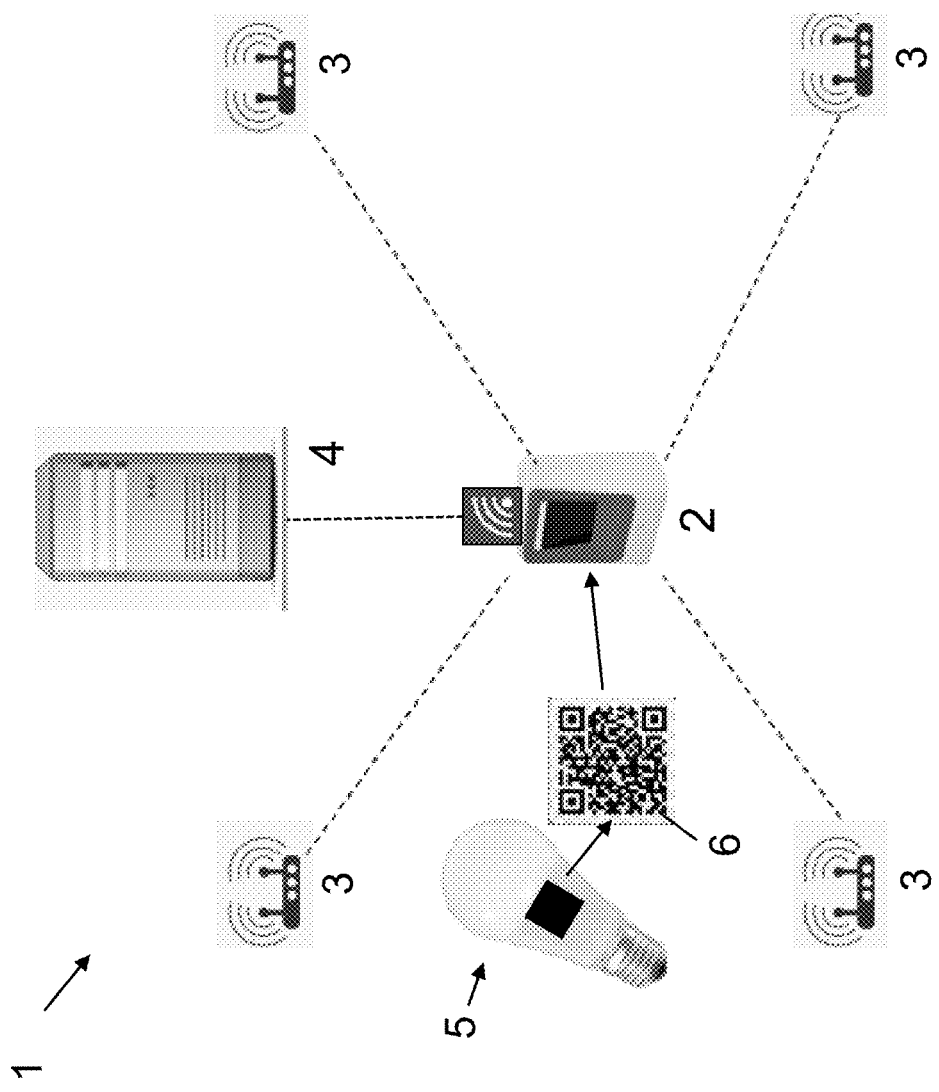
FIG. 1 shows a schematic overview of a system for managing network devices according to an embodiment.

FIG. 1 shows a schematic overview of a system for managing network devices according to an embodiment. The system 1 comprises a location device 2 or QR-locator, a number of positioning bases 3, and a computer server 4. The system 1 is configured to manage a plurality of network devices 5. The network device 5 shown in FIG. 1 is provided with a quick response code (QR-code) 6 containing device information. In the example of shown in FIG. 1, the network device 5 is a luminaire in the form of an adjustable or dimmable LED light bulb with an E27 socket. The LED light bulb is adjustable such that the luminous flux or brightness and the color temperature of the light emitted from the light bulb can be separately controlled. For controlling the LED light bulb, a wireless communication according to Zigbee (registered trademark) standard can be used. Although FIG. 1 shows only an LED light bulb, the system 1 can be used for managing other types of adjustable network devices, like luminaires, loudspeakers, heaters, coolers, or any other network devices with adjustable parameters.

Figure 2:
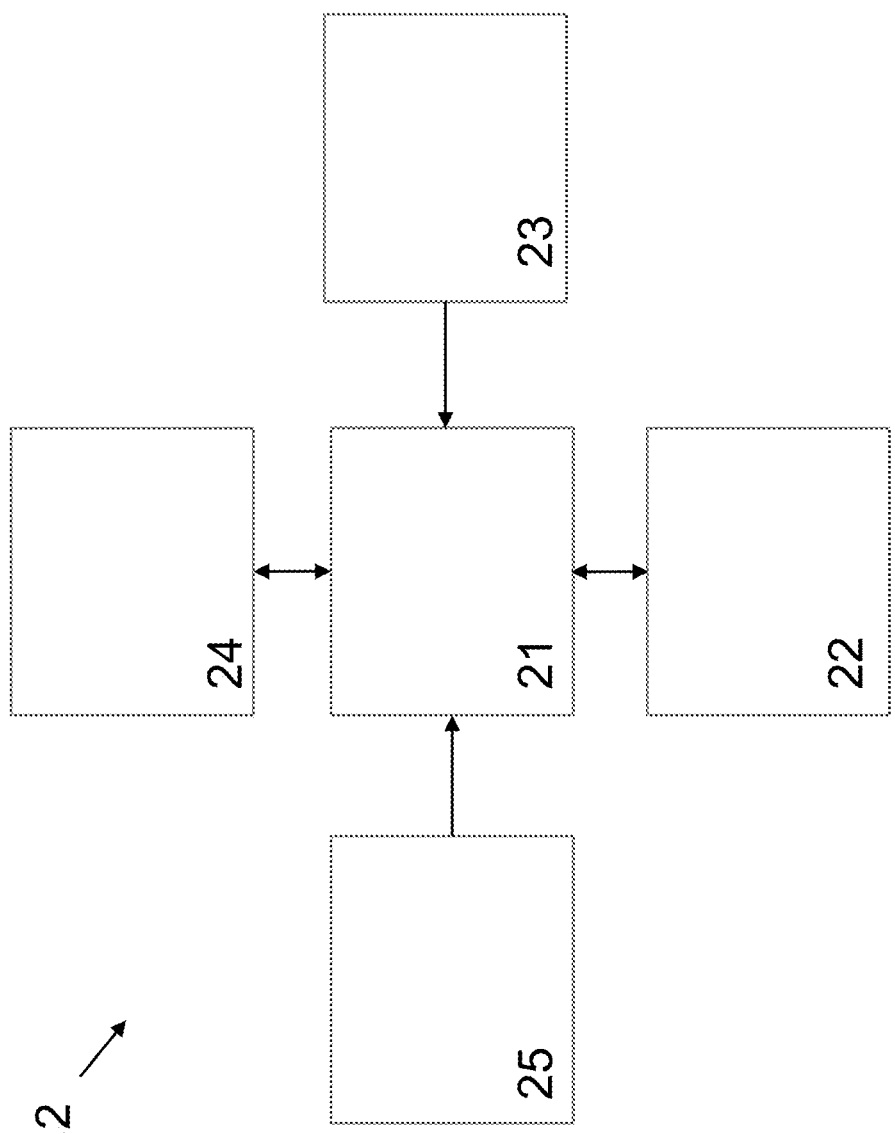
FIG. 2 shows a schematic structure of a location device according to an embodiment.

FIG. 2 shows a schematic structure of a location device according to an embodiment. The location device 2 comprises a processor 21 or central processing unit (CPU), a memory unit 22 for storing codes executable by the processor 21, and a QR-scanner 23 configured to scan QR-Codes (quick response code) of network devices 5. The location device 2 further comprises a communication interface 24 for establishing a wireless communication with the computer server 4 and a positioning tag 25 for determining the location of the location device 2 relative to the positioning bases 3. In the embodiment of FIG. 2, the communication interface 24 comprises a Wi-Fi (registered trademark) chip configured to establish the wireless communication according to the Wi-Fi standard.

Figure 3:
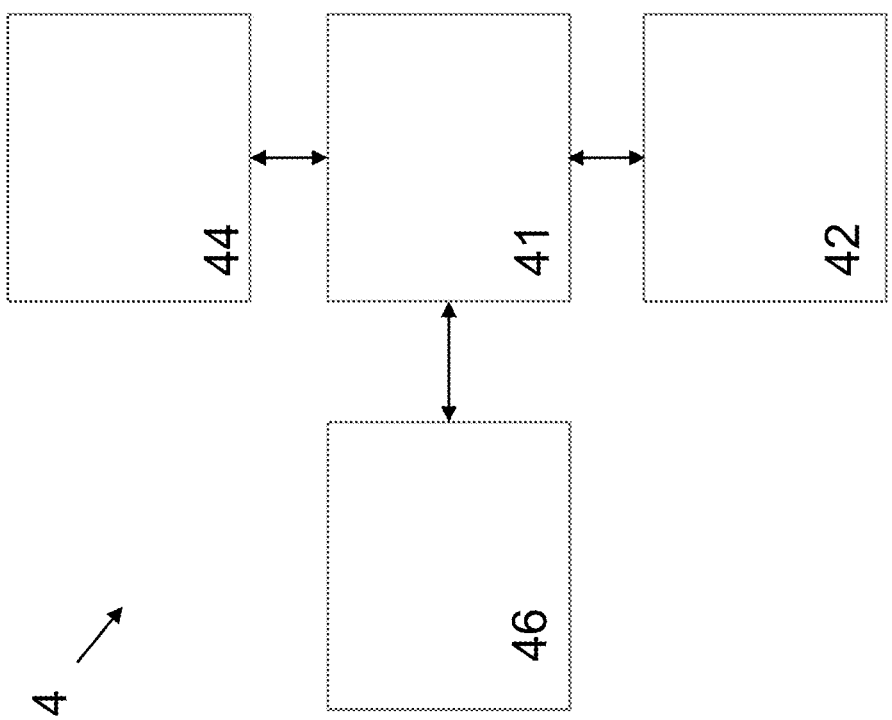
FIG. 3 shows a schematic overview of a computer server according to an embodiment.

FIG. 3 shows a schematic overview of a computer server according to an embodiment. The computer server 4 comprises a processor 41, a memory unit 42, a communication interface 44, and a user interface 46 (UI). The memory unit 42 is configured to store computer readable instructions executable by the processor 41. The communication interface 44 is configured to establish a wireless communication with a location device 2 according to FIG. 2. The user interface 46 is configured to present information to the user and to receive inputs from the user for controlling the network devices 5. In an embodiment, the UI 46 comprises a touchscreen display which is configured to visualize the model of the physical environment and to receive user commands for controlling the network devices 5. In some embodiments, the UI 46 is configured such that the user can input the coordinates of the positioning bases 3.

The positioning bases 3 may be arranged at specific locations with known coordinates in a lighting management environment, such as an office or a residential building. The positioning bases 3 positioned at known locations can serve as a frame of reference or reference system for determining positions of the network devices 5 in the environment. In particular, the wireless communication between the positioning tag 25 of the location device 2 and the location bases 3 can be used for collecting position data and for determining positions of the network devices 5. By measuring the respective distances from the positioning tag 25 of the location device 2 to the positioning bases 3, the location of the location device 2 relative to the positioning bases 3 can be determined. Further, by measuring the distances between the positioning tag 25 and the communication bases 3, while the location device 2 is kept at one of the network devices 5, the distances between the respective network device 5 and the positioning bases 3 can be determined.

The position data can be sent from the location device 2 over the Wi-Fi communication to the computer server 4 for further processing.

The QR-scanner 23 of the location device 2 can be used to read the QR-codes 6 of the network devices 5. The QR-codes may comprise device information representing unique ID number, manufacturer ID, specification data, etc.

After scanning a QR-code 6 of a network device 5 by the QR-scanner 23 of the location device 2, the corresponding device information data may be sent over the Wi-Fi communication from the location device 2 to the computer server 4. Prior to sending to the computer server, the location data and/or device information data may be stored in the memory unit 22 and/or processed by the processor 21 of the location device 2.

The system 1 allows to collect the location data and the device information data of a plurality of network devices 5 at the computer server 4 by approaching individual network devices 5 and carrying out the steps of collecting and sending the location data and the device information data of individual network devices 5.

The device information data and the location data for the network devices 5 may be mapped by the computer server 4 to a model of the physical environment, such that the device information data of the network devices 5 is assigned to corresponding locations in the model of the physical environment, according to the positions of the network device 5.

In some embodiments, especially in case of large physical environments, like landscaped offices or production halls, the system 1 also may comprise one or more gateways or communication nodes connected with the computer server 4 and configured to individually address the network devices 5. In particular, the gateways may be configured to transfer control signals received from the computer server 4 over a communication bus to individual network devices 5. In some embodiments, the gateways are configured to wirelessly transfer the control signals to the individual network devices 5. The gateways may be assigned to separate control zones of the environment such that all network devices in a single zone are controlled over a single gateway. In some embodiments, the UI 46 is configured to indicate the separate control zones in the model of the environment and to separately control network devices in each control zone of the physical environment. By dividing the environment into control zones and separately controlling the control zones with respective gateways, the handling of large networks with many network devices 5 distributed over larger spaces can be facilitated.

Figure 4:
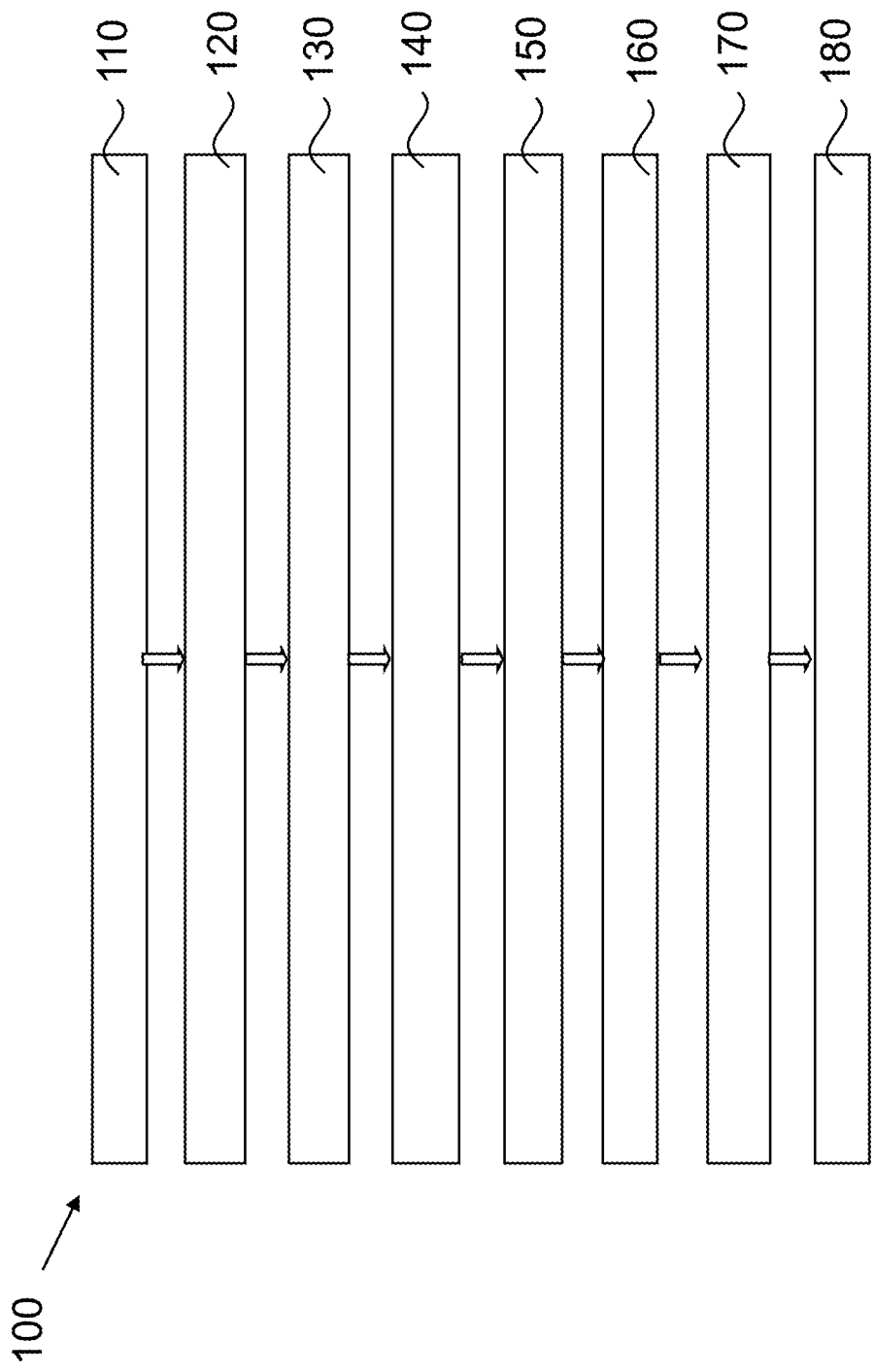
FIG. 4 shows a flow chart of a method for managing network devices according to an embodiment.

FIG. 4 shows a flow chart of a method for managing network devices according to an embodiment. The method 100 for managing network devices may be, in particular, implemented in a system according to FIG. 1. According to the embodiment of FIG. 4, in step 110, the coordinates of the positioning bases 3 are inputted by the user via the UI 46 of the computer server 4. The coordinates of the positioning bases 3 may be, in particular, cartesian coordinates (X, Y, Z) of the positioning bases 3, relative to any common reference system.

In step 120, the positioning tags 25 of the location device 2 wirelessly communicates with the positioning bases 3. During the wireless communication of the positioning tag 25 with the positioning bases 3, the positioning tag may send the coordinates of the positioning bases 3 to the respective positioning bases 3. During the wireless communication, distances between the positioning tags 25 and the positioning bases 3 may be determined.

In step 130, the positioning tag 25 of the location device 2 determines the position of the location device 2 based on the distances between the positioning tag 25 and the positioning bases 3. The step 130 may comprise positioning the location device 2 at a network device 5, such that the position of the positioning tag 25 of the location device 2 essentially corresponds to the location of the network device 5.

In step 140, the QR-scanner 23 scans a QR-code 6 of the network device 5 at which the location device 2 is positioned such that the device information of the network device 5 is captured by the location device 2. The captured device information may be transferred to the processor 21 of the location device 2.

In step 150, the location device 2 sends a data package or message to the computer server 4, the data package comprising information on the network device position and the device information to the computer server 4.

In some embodiments, the steps 120, 130, 140, and 150 are repeated at different locations, in particular at the locations of different network devices 5, such that the device position and the device information of a plurality of network devices 5 can be collected and sent to the computer server 4.

In step 160, the device positions are mapped to a model of the environment. The model can be, in particular, 2D or 3D plan of the environment created based on environmental data representing the physical environment, saved in the memory unit 42 of the computer server 4. The environmental data representing the physical environment may be provided separately or downloaded from a computer cloud to the computer server 4. The mapping may be carried out in such a way that the device information data of the network devices 5 are assigned to locations in the model of the physical environment in accordance with the position of the network devices in the physical environment.

In some embodiments, like in the embodiment of FIG. 4, the method 100 comprises a step 170 in which the device locations corresponding to the positions of the network devices 5 are rearranged, automatically or by the user via the UI 46. In particular, the step 170 may comprise a step of modelling the operation of the network devices 5 in the physical environment and providing a modelled physical environment with the operating network devices 5. The device locations in the model of the physical environment may be rearranged in accordance with the results of the modelling.

In step 180, a device management interface on the UI 46 for controlling the network devices 5 is provided. The device management interface may display the model of the physical environment, for instance a floor plan in an office building, wherein the locations corresponding to the network devices 5 is indicated by icons. The icons indicating the network devices 5 may be interactive icons which can be activated by the user for controlling respective network devices 5. The method 100 may further comprise receiving user commands over the network management interface of the UI 46 for controlling the network devices 5.

Figure 5:
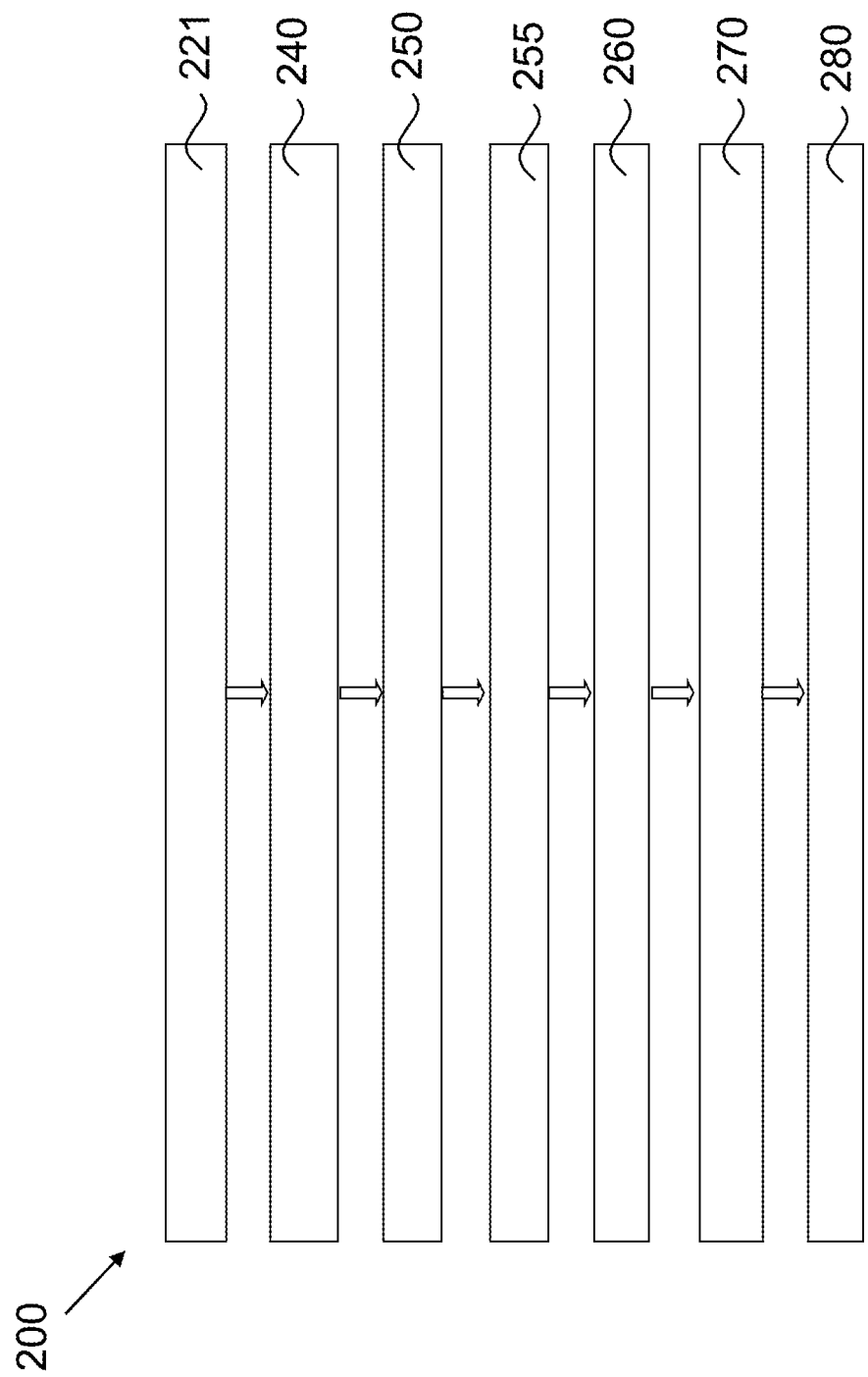
FIG. 5 shows a flow chart of a method for managing network devices according to another embodiment.

FIG. 5 shows a flow chart of a method for managing network devices according to another embodiment. The method 200 shown in FIG. 5 can be also implemented in a system for managing network devices 5 according to FIG. 1. In step 221 of the method 200, the positioning tag 25 of the location device 2 gets distance data representing the distances between the positioning tag 25 and the positioning bases 3.

In step 240, similar to step 140 of method 100, the QR-scanner 23 captures the device information by scanning a QR-code 6 of a network device 5 and forwards the device information to the processor 21 of the location device 2.

In step 250, the location device 2 sends a message containing the device information data and the distance data to the computer server 4. Thus, different from the process 100 of FIG. 4, the message sent from the location device 2 to the computer server 4 contains distance data or raw position data representing the distances from the location device 2 and the positioning bases 3. By sending the raw or unprocessed position data to the computer server 4, the calculation of the respective device position may be performed by the computer server 4. Hence, the workload of the processor 21 of the location device 2 can be reduced. Thus, a cheap and compact location device 2 with reduced computational capacities can be used for implementing the method.

In step 255, the device position is calculated by the computer server 4 based on the distance data and the known positions of the positioning bases 3. Prior to step 255, similar to step 110 of FIG. 4, the coordinates of the positioning bases 3 may be inputted by the user through the UI 46 of the computer server 4.

Further, similar to step 160 of method 100, in step 260, the network devices 5 are mapped to the model of the physical environment. The model of the physical environment may be provided based on environment data stored in the memory unit 42 of the computer server 4.

In the embodiment of method 200 of FIG. 5, the method 200 comprises a step 270 in which the device locations corresponding to the positions of the network devices 5 are rearranged by the user via the UI 46. The step 270 may comprise a step of modelling the operation of the network devices 5 in the physical environment based on a modelled physical environment and rearranging the network device locations in the model of the physical environment in accordance with the results of the modelling.

In step 280, a device management interface on the UI 46 for controlling the network devices 5 is provided. The device management interface may display the model of the physical environment with the locations corresponding to the network devices 5 indicated by icons. The icons indicating the network devices 5 may be interactive icons which can be activated by the user for controlling respective network devices 5. The method 200 may further comprise receiving user commands over a network management interface of the UI 46 for controlling the network devices 5.

In some embodiments the device management interface is configured to display a dashboard for displaying diagnostic parameters and/or network status information. The network status information may comprise status information of individual network devices 5 or global status of the network as a whole. In particular, the status information may comprise health status information of the network. The health status may comprise the ratio of the number of well-functioning or offline network devices to total number of network devices. The UI may be configured to display a dashboard showing the energy consumption of the network devices, in particular, one or more network devices of the plurality of network devices, and/or the energy consumption summary, in particular for a room or area, in particular over a selectable time period. The UI may be further configured to display a dashboard showing the remaining lifetime of the network devices. The UI may be configured to display a dashboard showing predictive maintenance data.

While at least one exemplary embodiment has been presented in the foregoing detailed description, it should be appreciated that a vast number of variations exists. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments.

What is claimed is:

1. A method for managing network devices arranged in a physical environment, the method comprising:
collecting position data of at least one network device with a location device for determining a position of the at least one network device relative to at least one positioning base;
collecting device information data from the at least one network device with the location device, the device information data representing individual properties of the at least one network device;
determining the position of the at least one network device according to the position data;
providing a model of the physical environment based on environment data;
mapping the at least one network device to the model of the physical environment such that the device information data of the at least one network device is assigned to at least one location in the model of the physical environment, according to the position of the at least one network device; and
displaying the model of the physical environment on a user interface (UI), the at least one network device being indicated by at least one icon in the model of the physical environment, for controlling the at least one network device based on the mapping of the at least one network device to the model of the physical environment.

2. The method according to claim 1, wherein the method further comprises:
adjusting at least one adjustable parameter of the at least one network device based on the model of the physical environment displayed on the UI.

3. The method according to claim 2, wherein the at least one network device comprises more than one network device, and wherein the adjusting comprises automatically adjusting the at least one adjustable parameter based on the positions of the more than one network devices in the environment.

4. The method according to claim 1, wherein the collecting of the device information data comprises scanning a QR-code of the at least one network device with a QR-scanner of the location device.

5. The method according to claim 1, wherein the method further comprises:
sending the position data and the device information data from the location device to a computer server.

6. The method according to claim 1, wherein the at least one network device comprises at least one luminaire, wherein the at least one adjustable parameter comprises at least one adjustable light parameter.

7. The method according to claim 6, wherein the method further comprises:
modelling an illumination of the physical environment illuminated by the at least one luminaire; and
displaying a modelled illumination on the UI.

8. A location device for managing network devices arranged in a physical environment, the location device comprising:
a processor;
a positioning tag configured to collect position data for determining positions of the network devices relative to at least one positioning base provided in a physical environment;
a QR-scanner for collecting device information data representing individual properties of the network devices;
a communication interface for communicating with a server; and
a memory unit configured to store instructions executable by the processor to cause the processor to receive the position data from the positioning tag and the device information data from the QR-scanner and to instruct the communication interface to send the position data and the device information data to the server.

9. The location device according to claim 8, wherein wireless communication of the positioning tag with the at least one positioning base is based on ultrawide band (UWB) technology.

10. The location device according to claim 8, wherein the QR-scanner is configured to collect the device information data by scanning QR-codes of the network devices.

11. The location device according to claim 8, wherein the instructions executable by the processor comprise instructions to process the position data received from the positioning tag prior to sending the position data to the server.

12. A system for managing a network of network devices arranged in a physical environment, the system comprising a computer server, a location device with a positioning tag for providing position data and a QR-scanner for providing device information data, the computer server comprising:
a communication interface configured to receive data from the location device and to send control signals to the network devices;
a user interface (UI) for controlling the network devices;
a processor; and
a memory unit configured to store environment data related to the physical environment, the position data, and the device information data, the memory unit being further configured to store instructions executable by the processor to provide a model of the physical environment, to map the network devices to the model of the physical environment, and to display the model of the physical environment on the UI, the at least one network device being indicated by at least one icon in the model of the physical environment, for controlling the at least one network device based on the mapping of the at least one network device to the model of the physical environment.

13. The system according to claim 12, wherein the system further comprises one or more gateways for communication between the server and the network devices.

14. The system according to claim 12, wherein the UI comprises an interactive user interface configured to control the network devices by selecting respective icons on the UI.

15. The system according to claim 12, wherein the UI is further configured to display diagnostic parameters indicating the operational state of the network devices.

* * * * *